United States Patent [19]

Everman

[11] Patent Number: 4,801,231
[45] Date of Patent: Jan. 31, 1989

[54] SELF-DRIVEN NUT AND JOINDERS INCORPORATING IT

[75] Inventor: Michael R. Everman, Santa Barbara, Calif.

[73] Assignee: AEC-ABLE Engineering Company, Inc., Goleta, Calif.

[21] Appl. No.: 36,785

[22] Filed: Apr. 10, 1987

[51] Int. Cl.$^4$ ............................................. F16B 37/00
[52] U.S. Cl. ................................. 411/432; 411/433; 411/438; 411/427; 411/289
[58] Field of Search .................. 411/432, 433, 10, 11, 411/12, 949, 950, 998, 427, 288, 289, 290, 438, 231

[56] References Cited

U.S. PATENT DOCUMENTS

| | | | |
|---|---|---|---|
| 179,994 | 7/1876 | Brallier | 411/950 X |
| 518,165 | 4/1894 | Thalaker | 411/933 X |
| 581,551 | 4/1897 | Green | 411/231 |
| 582,424 | 5/1897 | Hunt | 411/324 |
| 1,879,421 | 9/1932 | Nalle | 411/433 X |
| 2,587,560 | 2/1952 | Widmer | 411/231 |
| 4,648,293 | 3/1987 | McCauley | 411/427 X |
| 4,692,078 | 9/1987 | Dessouroux | 411/290 X |

FOREIGN PATENT DOCUMENTS

| | | | |
|---|---|---|---|
| 490519 | 1/1930 | Fed. Rep. of Germany | 411/438 |
| 20530 | 6/1972 | Japan | 411/433 |
| 151885 | 10/1920 | United Kingdom | 411/438 |
| 523403 | 7/1940 | United Kingdom | 411/223 |

Primary Examiner—Gary L. Smith
Assistant Examiner—Curtis Brueske
Attorney, Agent, or Firm—Donald D. Mon

[57] ABSTRACT

A self-driven nut having a relatively rotatable nut portion and anchor portion which are threadedly joined together. A spring rotatably biases them for relative rotation in one sense. A latch is provided to hold them against rotation with the spring compressed to store energy. Release of the latch enables the spring to drive the portions and torque down the nut.

10 Claims, 1 Drawing Sheet

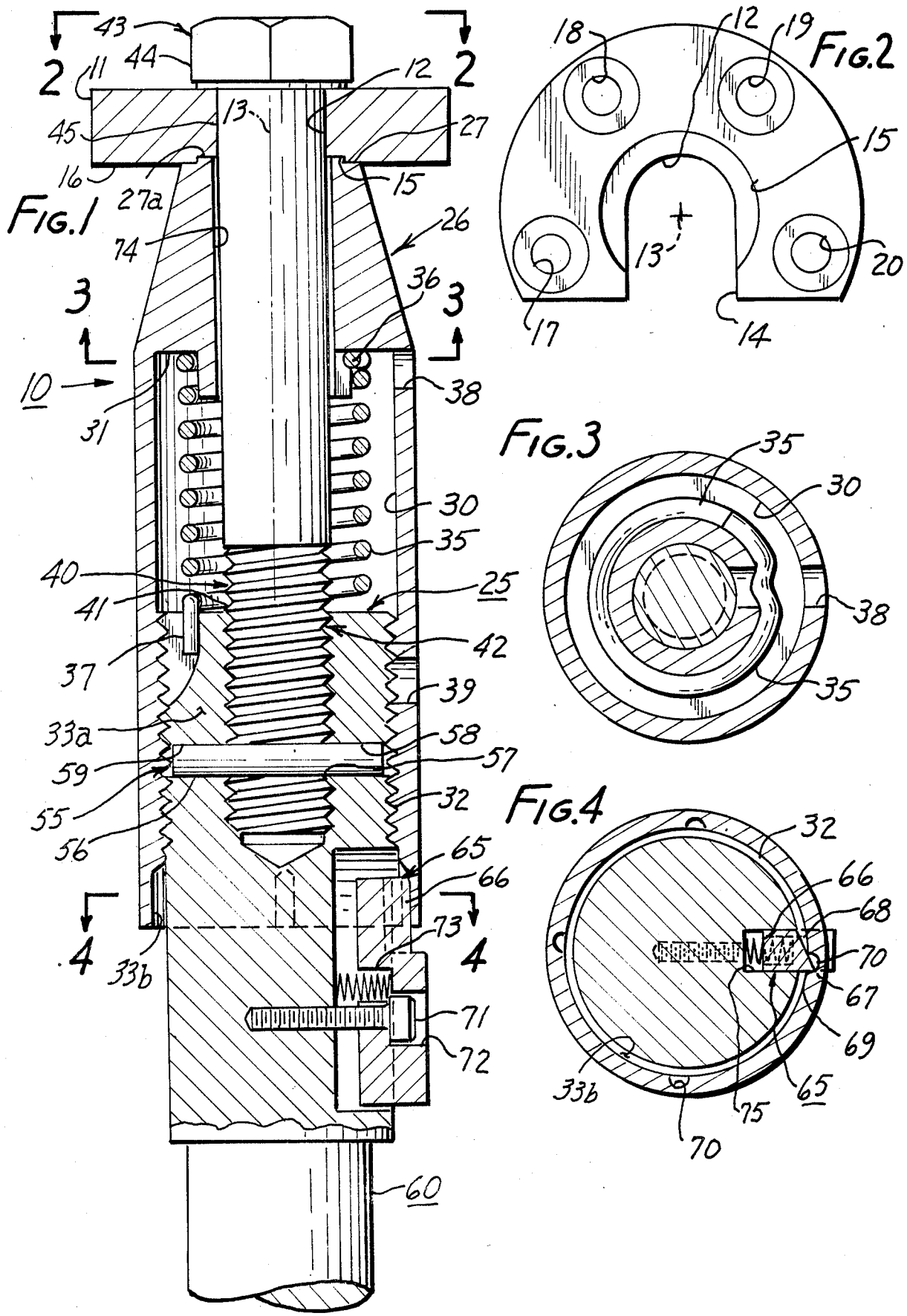

SELF-DRIVEN NUT AND JOINDERS INCORPORATING IT

FIELD OF THE INVENTION

This invention relates to a self-driven nut, self-driven from a pre-loaded condition toward a torqued, set condition by a prewound spring. Joinders may incorporate this nut, which include a threaded stem formed as a headed mandrel to which articles to be coupled may be attached. A releasable latch holds the nut in its pre-loaded condition.

BACKGROUND OF THE INVENTION

Torquing a nut onto a bolt to hold an object between the nut and the head of the bolt is common art. Because this is such a fundamental joinder, the art is replete with improvements both to the nut and to the bolt. Such joinders are commonly driven by tool engagement either at only one end or at both ends of the fastener. What all of them have in common is the exertion of a torque between the nut and the bolt to tighten the joinder.

Similarly, torque tools of widely varying characteristics are well known. They have in common the engagement of both parts of the joinder if the bolt can turn, or sometimes only of the nut if the bolt is otherwise restrained against turning. Tools which engage the nut and the bolt separately, and tools which drive both but from only one end of the joinder are also known. Whatever the situation, it is common practice to engage one or both parts of the joinder and to apply torque to set it. Torque may be applied from a power source such as a drill motor, or by means as simple as a hand wrench. In all such cases a tool is engaged to the joinder and a moment is somewhat exerted to tighten it.

Large numbers of such joinders are used every day with complete acceptance by the trade. It is no disadvantage for a workman standing on a floor or on some support to move a tool from joinder to joinder, and for him either to actuate a power wrench or to lean on a manual wrench.

However, there exist potential applications where a power tool cannot conveniently or effectively be used. For example, in space applications the tool itself consumes rocket throw weight to put it in place. Throw weight is inordinately expensive. After it is placed in space, then in operations outside the space craft the wrench must be carried around and manipulated. It exerts a counter torque which must somehow be resisted. One unacceptable situation is for the torque to be exerted on the operator so that he tends to rotate in a counter direction and must himself be restrained. Use of a simple hand wrench presents similar problems. Wrenches which keep the counter torques within themselves tend to be heavy.

It is an object of this invention to provide a joinder which has inherent torquing means that are inherently in the joinder and are ready to apply the torque needed to set the joinder. These can function with no more than the release of a latch. This is the self-driving nut of this invention. The source of torquing energy can conveniently be included in an appropriate envelope in the joinder, the "winding" energy being applied earlier, and adds some weight to the joinder which is justifiable by the other problems which it solves. The nut is present at the joinder site and is actuatable without requiring exertion of torque from outside of the joinder.

BRIEF DESCRIPTION OF THE INVENTION

A self-driven nut according to this invention includes an anchor portion adapted to be torsionally restrained to a threaded stem, and a threaded nut portion to be threaded onto the stem or threaded onto the anchor, but not onto both. A torsion spring is interposed between these portions to drive them counter-rotatively thereby to set the joinder.

According to a preferred but optional feature of the invention, the stem is part of a headed mandrel, and a workpiece to be engaged has a side-slotted passage to receive the stem but not to pass the head. The head and the nut portion are thereby adapted to clamp on to the workpiece.

According to yet another preferred but optional feature of the invention, the anchor portion can be provided with attachment means to receive a next assembly so as to attach it to the work piece. The nut and the stem thereby act as a joinder for this purpose.

The above and other features of this invention will be fully understood from the following detailed description and the accompanying drawings, in which:

BRIEF DESCRIPTION OF THE DRAWINGS

FIG. 1 is an axial cross section of the presently preferred embodiment of the invention;

FIG. 2 is a cross section taken at line 2—2 in FIG. 1;

FIG. 3 is a cross section taken at line 3—3 in FIG. 1; and

FIG. 4 is a cross section taken at line 4—4 in FIG. 1.

DETAILED DESCRIPTION OF THE INVENTION

The intended function of self-driving nut 10 is to form part of a joinder to engage with a workpiece 11. Workpiece 11 schematically illustrates some kind of structure such as a panel or the leg of a tower. The illustrated workpiece has a hole 12 with an axis 13 and a side slot 14. A countersink 15 is provided in face 16 of the structure. The countersink is centered on axis 13 and extends around the hole, except of course at the slot. Mounting holes 17, 18, 19, 20 are shown formed through work piece 11 illustrating that this workpiece can be attached to other structure if desired.

Nut 10 comprises an anchor portion 25 and a nut portion 26. Nut portion 26 has a bearing end. In the illustrated preferred embodiment, the bearing end is shaped to enter and fit into countersink 15 where its flat bearing face 27a bears against the workpiece. Face 27a is on nose 27. Should countersink 15 not be provided, then it may merely bear against a flat surface of the workpiece, but if the countersink is provided it gives additional restraint against movement of the stem out of the hole. The nut portion further includes an internal cylindrical wall 30 which is co-axial with axis 13, and extends to a base 31.

Anchor portion 25 has an anchor body 33a with an external thread 32, by means of which it is joined to nut portion 26 of nut 10. Rotation of anchor body 33a in the nut portion moves it axially relative to the nut portion. A clearance 33b is formed between the anchor body and the inside wall of the nut portion at an end of the nut portion for a purpose yet to be described. A torsion spring 35 is hooked to the nut portion in a slot at 36, and to the anchor portion in a slot at 37.

Tool engagement holes 38, 39 may be provided in the nut portion to grasp the nut portion in order to turn it relative to the anchor portion so as to wind the torsion spring. Conveniently, the external surface of wall 30 may be knurled so it can be grasped.

It will be seen that if the anchor portion is restrained, and the nut portion is turned counterclockwise relative to it, a left-hand helix torsion spring will be wound up and then will serve to store energy for driving purposes. A stem 40 has a thread 41 engageable with thread 42 in the anchor body. The stem forms part of a mandrel 43 and has a head 44. It also includes a smooth, unthreaded portion 45 that can snugly fit in slot 14. This portion of the stem can pass laterally through the slot and into hole 12. The enlarged head will not pass through the hole or the slot. Therefore, when nose 27 of the nut portion bears against the front side of the structure, and the head is drawn against the back side of the structure, the structure will be firmly clamped by the self-driving nut, and also the nut will be firmly retained to the structure. Should the workpiece, instead of being a single object as shown by a plurality of objects, they will be clamped together in this same manner.

The mandrel is part of a threaded fastener element to which nut 10 is engaged to make a joinder. In this preferred embodiment, this fastener part is initially attached to anchor body 33a so as to be non-rotatable relative to the anchor body. That is the function of attachment means 55 (cross pin 56). When the self-driving nut initially includes a mandrel as shown, it is adapted for quick and accurate placement and installation, which is useful in outside-of-vehicle operations in space.

The nut, when attached to another fastener element either separate from the nut or carried with it as mandrel 43 is carried in FIG. 1, can serve a purpose in addition to that of joinder. For example, shaft 60 in FIG. 1 can be integral with, or otherwise joined to the anchor portion. It constitutes a "next assembly" joined to the workpiece by the nut, or can serve as a mounting means for another next assembly.

In order for the nut to be placed in its pre-loaded condition it is necessary to turn the nut portion relative to the anchor portion and then to hold it until time to release the torquing energy. For this purpose a releasable latch means 65 is provided. As best shown in FIGS. 1 and 4, it constitutes a movable latch block 66 with a tooth 67 having a ramp face 68 and a lock face 69. A plurality of detents 70 are provided in the nut portion. The latch block is supported for radial in-and-out movement by the walls of slot 75, and restrained by headed pin 71, its head being seated in an enlarged hole 72. A bias spring 73 biases the block radially outward toward a latched position. As viewed in FIG. 4, the lock face 69 prevents counterclockwise rotation of the nut portion relative to the anchor portion. The ramp face permits clockwise rotation. The latch can be released by pressing radially inward on block 66.

The advantages of this self-driving nut and of the joinders it enables should be evident from the foregoing. Assuming that one wishes to attach a next assembly such as shaft 60 to structures such as workpiece 11, it is only necessary that the nose of the nut initially be spaced far enough from the head of the mandrel to enable the stem to be moved into a central position co-axial with axis 13. Then assuming that the nut has been wound to its pre-loaded condition, the latch means is released and the nut will quickly torque down to draw the nut portion and the head of the mandrel against the structure. As stated before, this can constitute an assembly of structures exemplified by workpiece 11 or an attachment with structure one to another or in any combination. The torque exerted is determined by the dimensions and by the pre-load applied to the device determined by the properties of the spring.

Should only a joinder of workpieces 11 be desired, then shaft 60 or the next assembly will be omitted.

It will be appreciated that the setting of this joinder requires no more than the push of a latch button. Therefore a torquing operation can be performed without strenuous or troublesome exertion by the astronaut or other user. The torque loading operation can conveniently be done before departing the earth, or at any other convenient time. Torque tools are not required for the final installation.

This invention is not to be limited by the embodiments shown in the drawings and described in the description, which are given by way of example and not of limitation, but only in accordance with the scope of the appended claims.

We claim:

1. A self-driven nut having a central axis, comprising:
   an axial nut portion having an axial passage, an internal thread in said passage, and a bearing face;
   an axial anchor portion having an anchor body coaxial with and inside said nut portion, said portions being rotatable relative to one another, said anchor body having an external thread engaged to said internal thread, whereby said relative rotation moves said portions axially relative to each other;
   torsion bias means interposed between said portions adapted to be deformed to store energy when the portions are turned relative to one another in a first counter-rotative direction, and to exert said energy to turn the portions relative to one another in a second, opposite counter-rotative direction when released to do so; and
   releasable latch means interposed between said portions to permit relative counter rotation in said first direction in order to store energy, and to prevent relative counter rotation in said second direction until released to enable said energy to be exerted.

2. A self-driven nut according to claim 1 in which said anchor portion is adapted to receive and engage a stem which has passed through said nut portion; and means for restraining said anchor portion against rotation relative to said stem.

3. A self-driven nut according to claim 2 in which said anchor portion is adapted for engagement to a next structure.

4. A self-driven nut according to claim 1 in which said bias means is a torsion spring extending axially in said nut portion and anchored to both portions.

5. A self-driven nut according to claim 4 in which said anchor portion is adapted to receive and engage a stem which has passed through said nut portion; and means for restraining said anchor portion against rotation relative to said stem.

6. A self-driven nut according to claim 2 in which said stem includes a radially enlarged head spaced from said anchor body.

7. In combination:
   a self-driven nut according to claim 6; and
   a workpiece having an axial hole therethrough, a side slot through said workpiece into said hole admitting said stem but not passing said head.

8. A combination according to claim 7 in which said head engages one side of said structure, and in which said structure has a smooth surface surrounding the unslotted part of the periphery of said hole to be engaged by said bearing face of said nut portion.

9. A combination according to claim 8 in which said smooth surface is recessed to assist in retention of said bearing face against movement in the direction of said slot.

10. A combination according to claim 9 in which said anchor portion is adapted for engagement to a next structure.

* * * * *